(12) United States Patent
Best

(10) Patent No.: US 7,371,163 B1
(45) Date of Patent: May 13, 2008

(54) 3D PORTABLE GAME SYSTEM

(76) Inventor: Robert M. Best, 5100 S. Cleveland Ave., suite 318, #325, Fort Myers, FL (US) 33907

( * ) Notice: Subject to any disclaimer, the term of this patent is extended or adjusted under 35 U.S.C. 154(b) by 785 days.

(21) Appl. No.: 10/791,042

(22) Filed: Mar. 1, 2004

Related U.S. Application Data

(63) Continuation-in-part of application No. 09/928,294, filed on Aug. 10, 2001, which is a continuation-in-part of application No. 09/853,487, filed on May 10, 2001, now Pat. No. 6,966,837.

(51) Int. Cl.
A63F 13/00 (2006.01)
A63F 9/24 (2006.01)

(52) U.S. Cl. ............................................. 463/1; 463/32

(58) Field of Classification Search ............ 463/31–33, 463/37–38, 1
See application file for complete search history.

(56) References Cited

U.S. PATENT DOCUMENTS

| | | |
|---|---|---|
| 5,184,830 A | 2/1993 | Okada et al. |
| 5,393,073 A | 2/1995 | Best |
| 5,577,960 A * | 11/1996 | Sasaki .......................... 463/32 |
| 5,682,171 A | 10/1997 | Yokoi |
| 5,903,257 A * | 5/1999 | Nishiumi et al. ........... 345/157 |
| 6,055,013 A | 4/2000 | Woodgate et al. |
| 6,132,315 A | 10/2000 | Miyamoto et al. |
| 6,139,433 A | 10/2000 | Miyamoto et al. |
| 6,241,610 B1 | 6/2001 | Miyamoto et al. |
| 6,296,570 B1 | 10/2001 | Miyamoto et al. |
| 6,314,483 B1 | 11/2001 | Goto |
| 6,478,679 B1 | 11/2002 | Himoto et al. |
| 6,570,563 B1 * | 5/2003 | Honda .......................... 345/419 |
| 2001/0039212 A1 | 11/2001 | Sawano et al. |
| 2002/0165028 A1 | 11/2002 | Miyamoto et al. |
| 2004/0012671 A1 | 1/2004 | Jones et al. |

* cited by examiner

Primary Examiner—Robert E. Pezzuto
Assistant Examiner—Robert Mosser
(74) Attorney, Agent, or Firm—Graybeal Jackson Haley LLP

(57) ABSTRACT

A portable game system that contains an LCD touchscreen that displays 3D player-controlled characters moving in a simulated 3D game world and viewed from variable 3D viewpoints. The LCD touchscreen displays autostereoscopic images (without using glasses) so that a game player can reach into the game world and move virtual objects in 3D by pointing to them using the autostereoscopic touchscreen.

14 Claims, 14 Drawing Sheets

Fig. 10

RAM in portable system 53

| |
|---|
| program for converting 2D touchscreen coordinates to 3D coordinates |
| program for generating image of 3D world |
| program for determining viewpoint and camera angle |
| program for generating movement of a 3D character in a 3D game world |
| program for superimposing a 3D object picture on a 3D background |
| program for animating a character |
| program for displaying maps and other non-animated pictures |
| |
| data for simulated 3D world |
| data for object in simulated 3D world |
| data for animated character in simulated 3D world |
| data for character descriptions (polygons, textures, etc) |
| data for terrain descriptions (polygons, textures, etc) |
| data for maps, word menus, etc. |
| data for viewpoints and camera angles in 3D game world |
| stereoscopic pixel data |
| data for 2D touchscreen coordinates |
| data for 3D spatial coordinates of objects |

3D PORTABLE GAME SYSTEM

CROSS-REFERENCES TO RELATED APPLICATIONS

This is a continuation in part of application Ser. No. 09/928,294 filed Aug. 10, 2001, which is a continuation in part of application Ser. No. 09/853,487 filed May 10, 2001 now U.S. Pat. No. 6,966,837, the entire contents of which are incorporated by reference herein.

FIELD OF THE INVENTION

This invention relates generally to electronic game systems and more particularly to portable game systems that provide 3-dimensional displays.

BACKGROUND OF THE INVENTION

Handheld portable game systems that have liquid crystal display (LCD) screens are well known and are described in U.S. Pat. No. 5,184,830. US patent application 2002/0165028 discloses a portable game system that has a main processor and an image processing unit for display on an LCD screen, but this coprocessor does not generate characters with texture mapped polygons. U.S. Pat. No. 6,241,610 describes a video game system that generates characters with texture mapped polygons in a non-portable game machine, but does not mention a portable game machine. U.S. Pat. No. 5,682,171 describes a portable game system that provides a stereoscopic display, but does not mention polygons. U.S. Pat. No. 6,296,570 describes a game system that renders polygons but it is not a portable game system. U.S. Pat. No. 6,132,315 describes both a portable game system and a video game console system, but the portable system does not generate polygons and the console system that generates polygons is not portable.

Therefore, a need exists for a portable game system that generates and displays natural looking pictures of animated characters that are rendered as 3-dimensional (3D) texture-mapped polygons, and also display multiple views of the game characters on the LCDs from different points of view and angles in a natural-looking 3D game world.

It is also desirable for the 3D characters to be displayed stereoscopically in a 3D the LCD display device.

SUMMARY OF THE INVENTION

An embodiment of this invention is a handheld portable game system that generates 3D moving characters as texture-mapped polygons in simulated 3D game worlds for display on an LCD screen. The portable game system LCD screen displays 3D characters and other 3D objects from variable viewpoints and directions in the 3D game world. The LCD screen may also display maps, words, numbers, and 2D pictures. The 3D portable game system provides analog manual control devices such as joysticks or touchpads that provide 3D control of player-controlled characters.

Simulated 3D characters such as people are displayed on an LCD screen of the portable game system in a 3D pictorial game world. In the preferred embodiment, the 3D characters and the 3D game world are displayed autostereoscopically to stimulate depth perception in each player's vision without requiring polarizing eyeglasses or other head-mounted viewing aids.

The portable game system generates 3D characters and objects from multiple viewpoints in the 3D world. Images generated from pairs of these viewpoints can simulate images viewed from a player's two eyes. Because of parallax in a player's binocular vision, each player viewing the game world from a pair of stereoscopically separated points of view will experience depth perception of simulated 3D game world objects.

The portable game system may also be linked to another LCD unit or to a console game system that generates a video signal for display on a TV screen. Such multiple display systems will provide a unified game experience in which a combination of displayed images provide more visibility of the game world from multiple viewpoints and a more vivid game world when viewed stereoscopically. Some of the pictures displayed on the LCD screens may represent different areas of the simulated world at different times, different areas at the same time, or different views of the same area at the same time.

By displaying pictures of people and animals as texture mapped polygons from variable viewpoints on a portable game system LCD, these 3D pictures of game characters in 3D worlds will provide quicker and more accurate recognition and selection of actions, situations, locations, and directions of game characters on the portable system LCD that players already experience from video games displayed on a TV screen. In addition, displaying the 3D characters in the 3D world stereoscopically will provide a game experience with vivid realism and enjoyment.

BRIEF DESCRIPTION OF THE DRAWINGS

FIG. 10 is an example of a memory map of various programs and data stored in a portable game system RAM.

DETAILED DESCRIPTION OF EXEMPLARY EMBODIMENT

Figure 1:
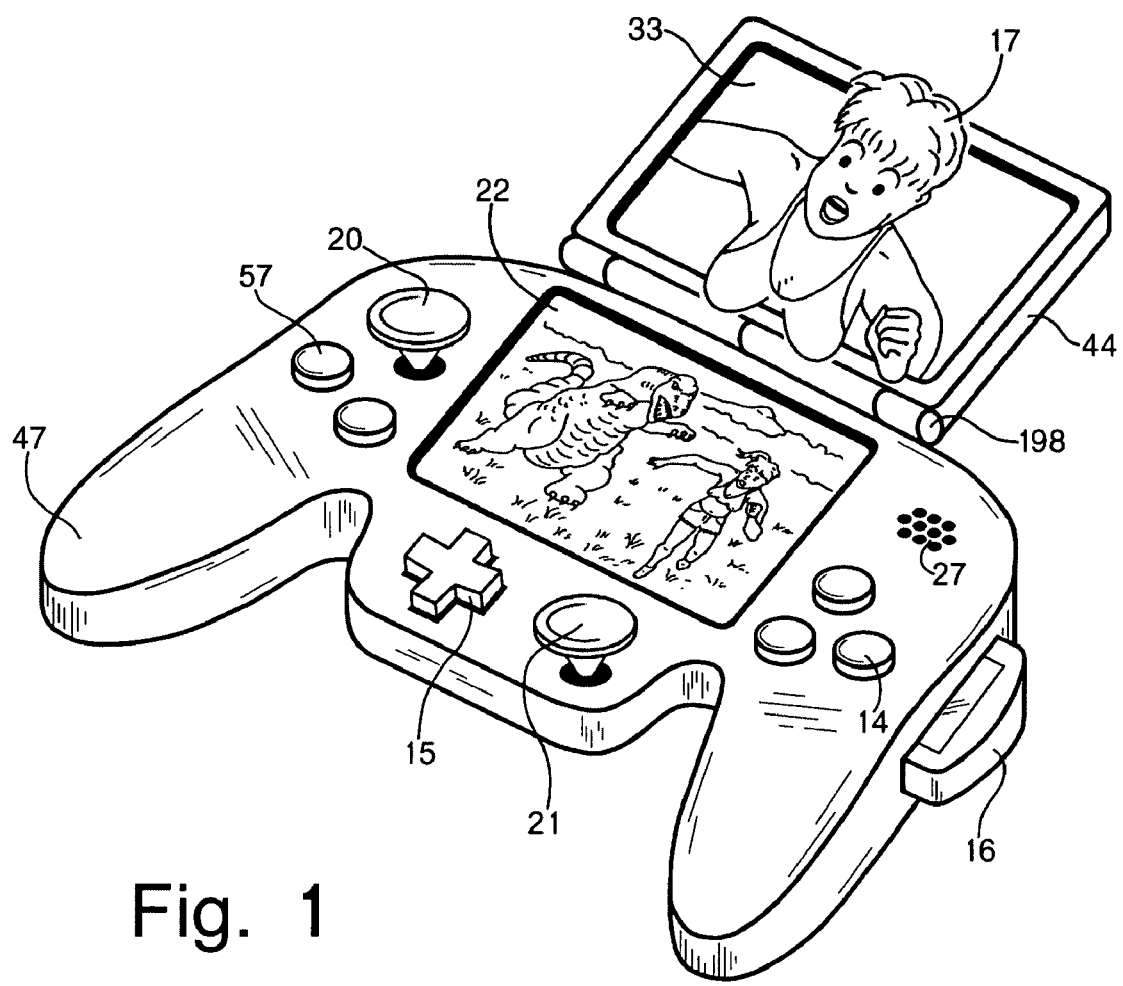
FIG. 1 is a perspective view of a portable game system that generates 3D pictures from texture rendered polygons for display on an LCD plus an attached LCD that displays autostereoscopic images.

FIG. 1 is a perspective view of an exemplary portable game system 47 that includes two LCD devices 22 and 33. Simulated 3D game worlds are displayed on LCD 22 and 33 and have 3D characters generated as texture mapped polygons viewed from many variable viewpoints. LCD 33 may be an autostereoscopic display device (that requires no eyeware) as described below with reference to FIGS. 13, 14, and 14a.

Portable game system 47 contains miniature analog joysticks 20 and 21 for manually controlling fine 3D movements of player characters and virtual cameras in the simulated 3D game worlds. Touch-sensitive panels 23 (FIG. 4) on LCD displays 22 and 33 and touchpads 24 (FIG. 8) may substitute for joysticks 20 and 21. External memory 16 may contain semiconductor memory or an optically coded disk. Sound is provided by speaker 27.

Each player controlled character is rendered as 3D textured polygons moving in the simulated 3D world as viewed from different viewpoints and angles. Player characters are not just symbols representing characters, but rather are generated as images of are not just like or animal-like characters with multiple body parts such as hands, arms, legs, faces, and clothing.

Portable game system 47 generates simulated 3D game worlds in which 3D characters and other objects move in 3-dimensions. Player 10 may operate control devices 20, 15, 21, 14, 57 to control 3D movement and select alternative views of the 3D simulated world from different viewpoints and/or angles for display on LCD 22 and 33.

By having two or more LCD display devices in or attached to portable game system 47, each LCD may display different objects in the 3D simulated world that are viewed from different viewpoints and angles. A player may select and monitor trouble areas in the simulated world, similar to a security guard monitoring closed-circuit television pictures from security cameras. A program in portable game system 47 may cycle through several views of the simulated world selected by player 10 for display in succession on one or more LCD screens.

A map of one part of the simulated world may be displayed on one LCD 22, while a picture of a portion of the simulated 3D world is displayed on the second LCD 33.

One or both LCD displays 22 and 33 may display images that are stereoscopic, preferably autostereoscopic (which require no eyeglasses or goggles), so that a player may experience full depth perception of 3D characters and other objects and the 3D world viewed from different viewpoints on at least one of the two LCD devices. Such stereoscopic LCD displays are described below with reference to FIGS. 13, 14, and 14a.

Figure 2:
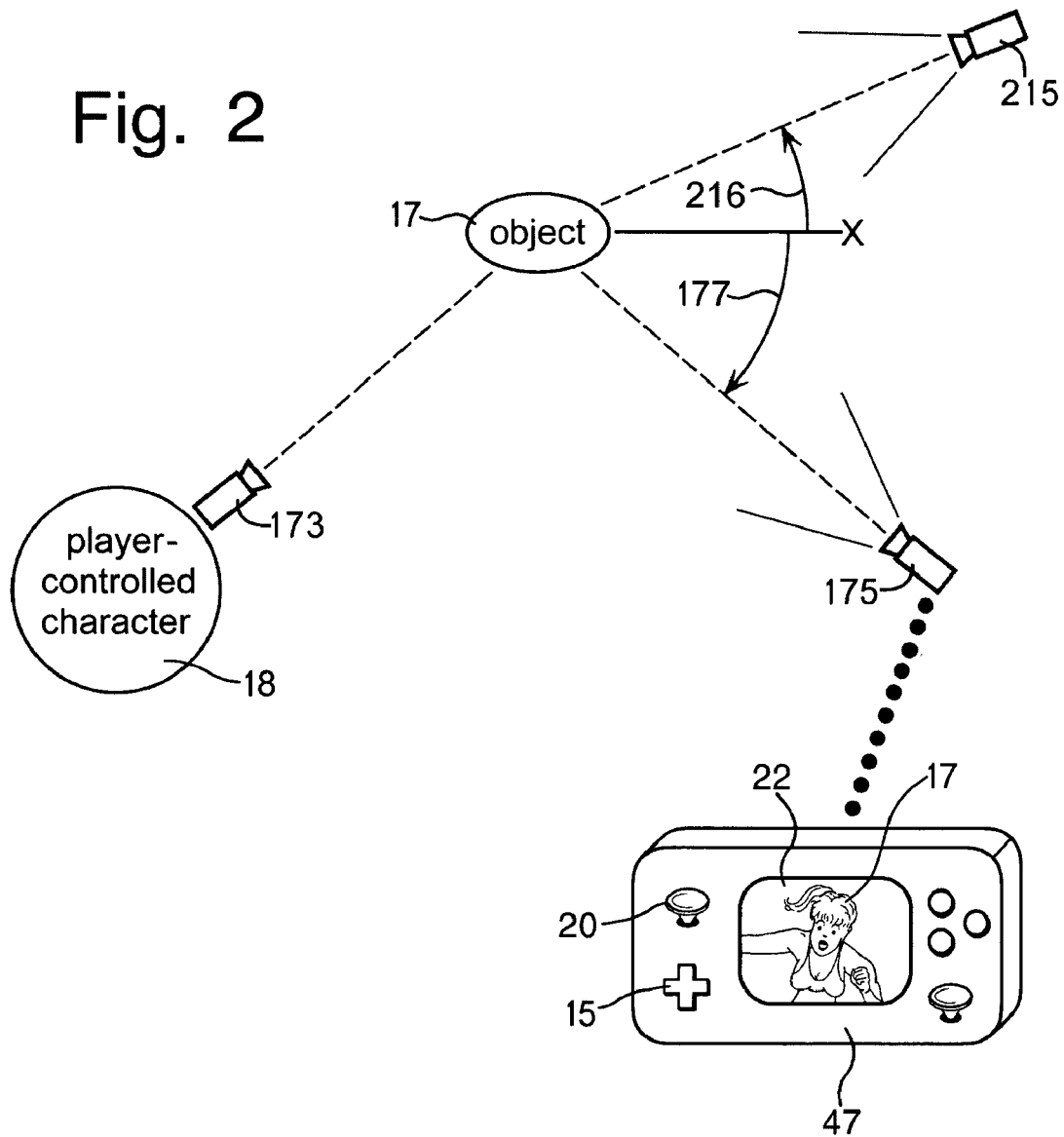
FIG. 2 illustrates views of a 3D object that may be generated from three different viewpoints and virtual camera angles for display on a portable game system LCD.

FIG. 2 illustrates how a 3D object 17 (a player character in this example) can be displayed on LCD screen 22 from different angles, depending on the 3D point of view perspective) from which a simulated virtual "camera" is calculated within a simulated 3D game world generated by processor 50 (FIG. 4) in portable game system 47. In this example, processor 50 generates three different images of object 17 from three different viewpoints indicated by the three simulated "cameras" 173, 175, and 215. The non-stereoscopic image of character 17 being displayed on LCD 22 is calculated from viewpoint 175 as indicated by the lines of dots in FIG. 2.

The word "camera" is used herein in the sense used in U.S. Pat. No. 6,139,433, columns 33-34. "Camera" is a metaphor for a calculated point of view (viewpoint, POV, or perspective) in a simulated 3-dimensional game world from which picture data for a portion of that world is calculated.

Character 17 is 3-dimensional in the sense that the displayed points of body and clothing texture form a three-dimensional surface in the simulated 3D game world, not a planar surface. However, the picture displayed on LCD 22 is a projected 2D image and all the pixels in the image are calculated from one viewpoint 175 in this example.

The picture of object 17 generated from the viewpoint of virtual camera 175, i.e. the picture displayed on LCD 22, may be recalculated from many other viewpoints and camera angles such as 177 and 216. These recalculated images are projected at variable camera angles (in a direction that may be controlled by a human player) onto a virtual 2D plane orthogonal to the line intersecting virtual object 17 and virtual camera 175.

The player may relocate a virtual viewpoint by pressing a combination of buttons 14, cross-switch 15, joystick 20, or other manipulatable devices on portable game system 47 or by pointing to object 17 with a cursor or highlight on LCD 22 using a manipulatable device or a combination thereof. A player may also select a viewpoint by moving a cursor on a map displayed on LCD screen 22 by manipulating control devices in portable game system 47 or another linked system. A player may also retain the same viewpoint while manually changing angle 177 to direct the virtual camera 175 at another object.

When a player selects a viewpoint 175 and a direction angle of view 177 and a picture of object 17 from that perspective is generated for display on LCD 22, the player may zoom-in on object 17 by manipulating a control device on a portable game system 47. This enables a player to observe a close-up picture of, for example, a character's hand performing a manual task in greater detail on LCD 22. The player may also zoom-out by manipulating a control device which causes the picture on LCD 22 to cover a broader field of view.

Figure 3:
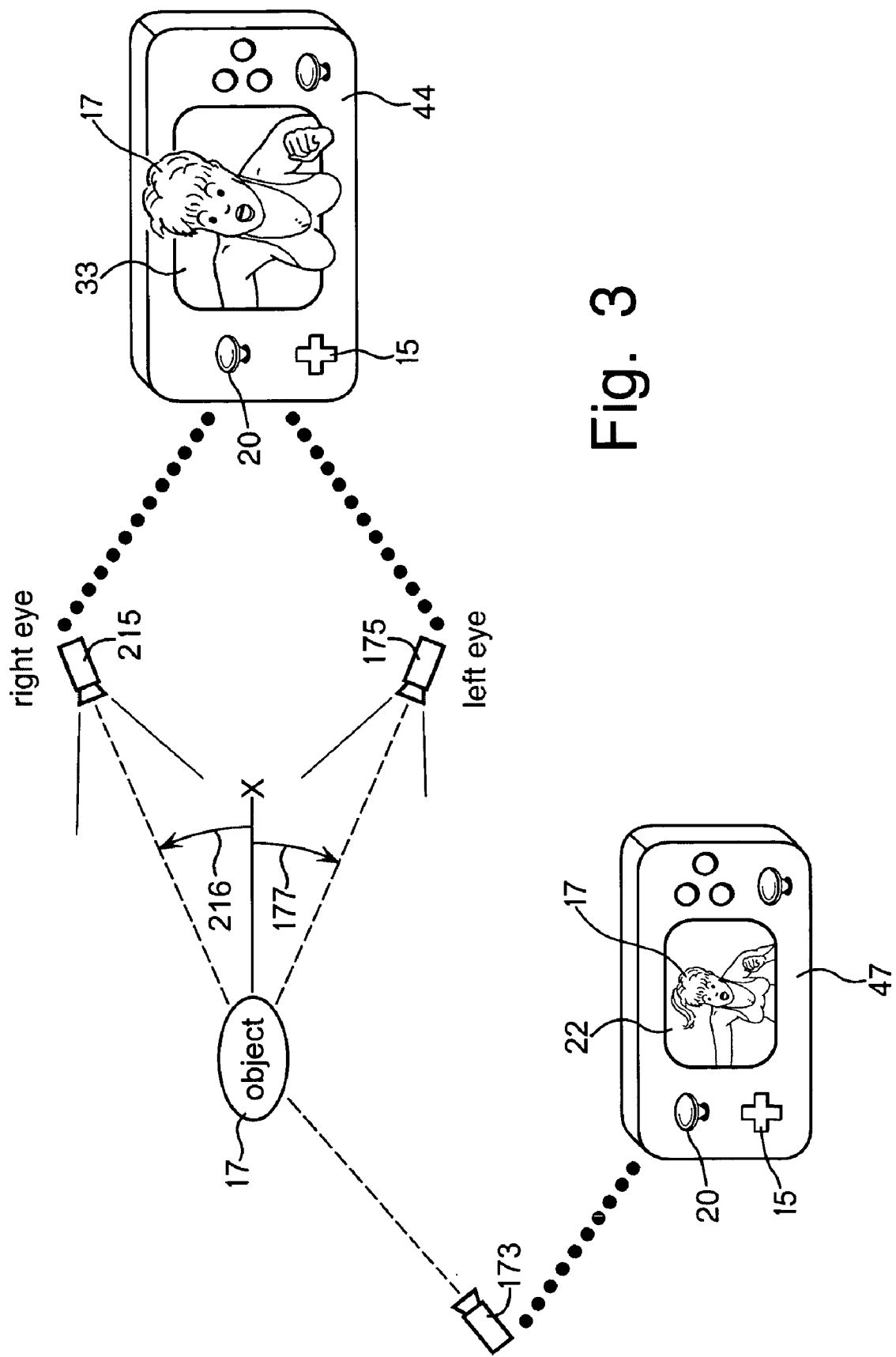
FIG. 3 illustrates views of a 3D object that may be generated from three different viewpoints and virtual camera angles for display on two portable game system LCDs, one provides stereoscopic 3D images.

FIG. 3 illustrates how a 3D object 17 (a player character in this example) can be displayed on LCD screen 33 as a stereoscopic image using the same image generation processes described above with reference to FIG. 2. The two viewpoints or virtual "cameras" 175 and 215 that view object 17 from different angles, may be used as two virtual "eyes" by changing the way the generated pictures are displayed on LCD 33.

As illustrated in FIG. 2, two pictures of object 17 in FIG. 3 are generated as textured polygons from two different viewpoints 175 and 215 for display on LCD 33 (indicated by the two lines of dots). By using a stereoscopic LCD 33 in portable game system 47 such as described below with reference to FIG. 13, 14, or 14a, and by sending generated picture data representing viewpoints 175 and 215 to alternating columns of pixels in the LCD display plane (FIG. 13), a stereoscopic effect is produced as if viewed by a pair of cameras presenting a pair of stereoscopic images to a player's left eye and right eye.

As illustrated in FIG. 2, and likewise in FIG. 3, the directions from which object 17 is viewed are variable and may be manually controlled by the player. When the pair of images are zoomed-in for a close-up, angles 177 and 216 are increased to provide an illusion that object 17 is closer to cameras 175 and 215. Cameras 175/215 may also zoom out and angles 177 and 216 are reduced so that object 17 appears more distant on LCD 33.

A human player controls movements, directions, zoom, and point-of-view perspectives of cameras 175 or 215 using a directional input control member, such as direction-switch 15 or joysticks 20 or 21 in portable game system 47 (FIG. 4), or touchpad 24 (FIG. 8), or similar control members.

Object 17 may be viewed from any angle horizontally and in three dimensions from above and from below (not shown), where the viewing direction is centered on or near object 17 or any other object selected by the player. The viewpoint pair 175/215 may circle around object 17 and be directed toward object 17, so that LCD 33 displays object 17 from many different viewpoints and directions and camera angles in the simulated 3D game world stereoscopically.

Figure 4:
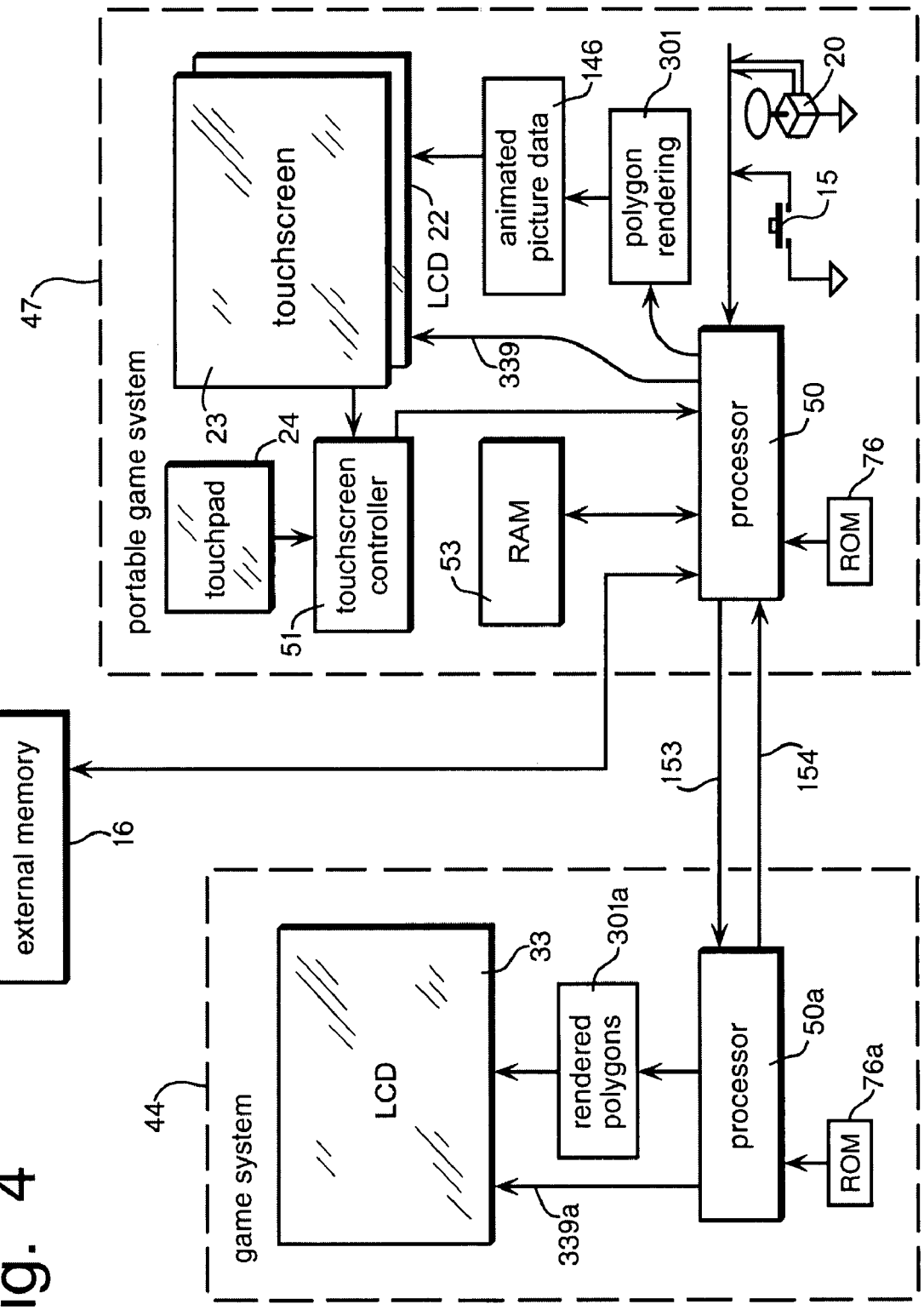
FIG. 4 is a block diagram of two linked portable game systems that provide stereoscopic 3D images.
Figure 7:
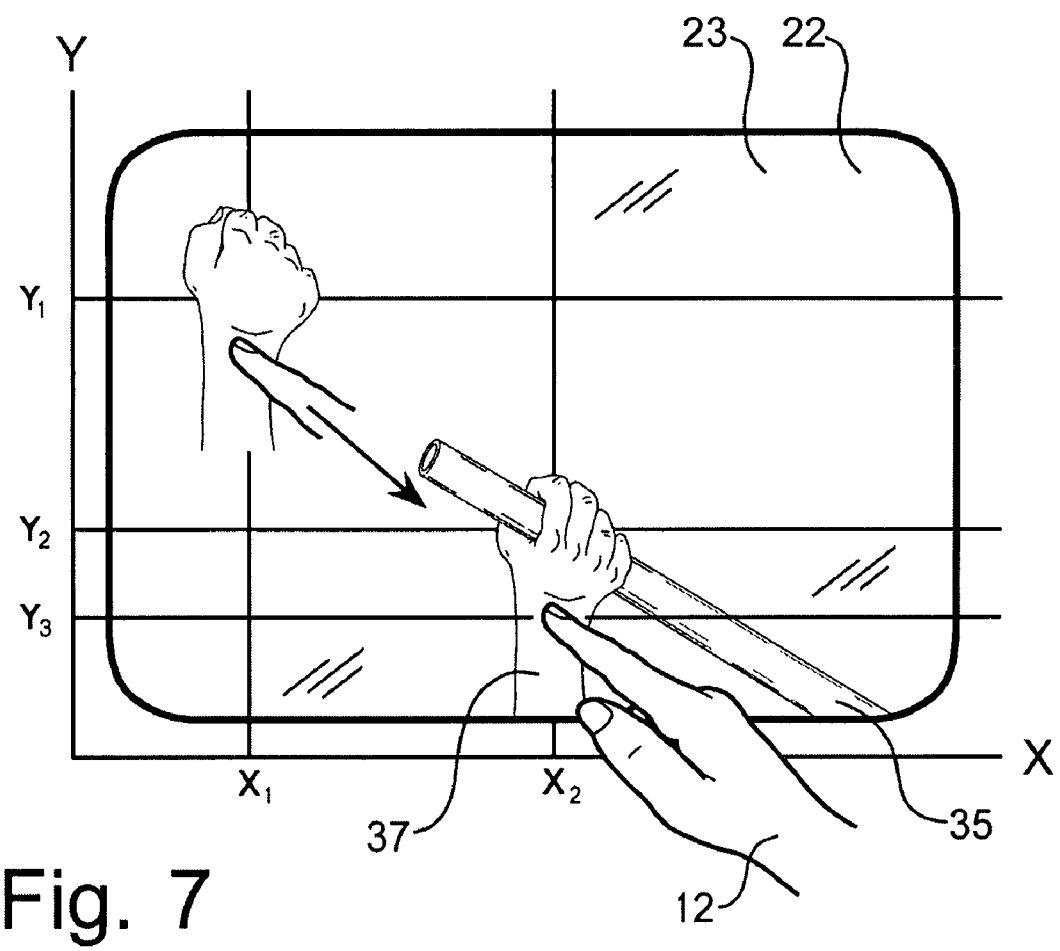
FIG. 7 is a touch-sensitive LCD screen with Cartesian coordinates superimposed to illustrate selection and movement of simulated objects displayed on the LCD touchscreen.
Figure 9:
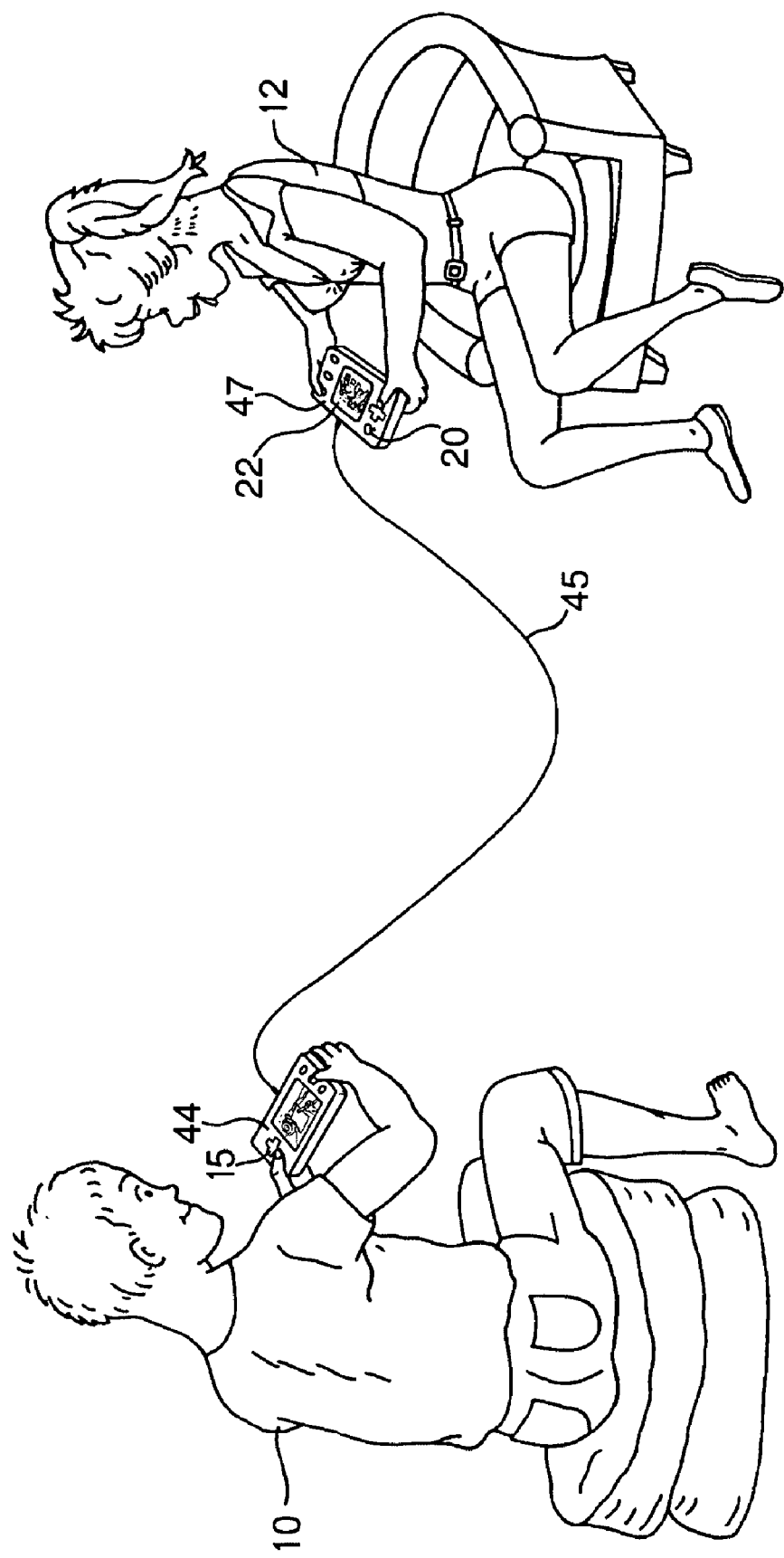
FIG. 9 illustrates two game players operating two linked portable game systems that generate 3D pictures from texture rendered polygons for display on LCDs.

FIG. 4 is a simplified block diagram of the major components of an exemplary game system in which two 3D portable game systems 47 and 44 of similar design are digitally linked by wire or wireless. Portable game system 44 is simplified in FIG. 4, but is assumed to have a design similar to portable game system 47. Use of this linked system by two players is illustrated in FIG. 9. Portable game system 47 may also be used as a stand-alone system, as illustrated in FIG. 7.

Portable game system 47 comprises CPU processor 50, RAM 53 for storing game programs and data, boot ROM 76 for power up and reset, direction switch 15 (only one of the 4 switches is shown), button switches 14 (not shown), and analog joystick 20. Touch-sensitive pad 24 or touch-sensitive screen 23 may substitute for joystick 20 or supplement joystick 20 for use by a player who is manually controlling player characters and other 3D objects. Such 3D objects in the simulated game world are generated by processor 50 and associated graphics co-processor (not shown) for display on LCD 22. Peripheral interface chip 88 (not shown) such as a UART is included for sending (153) and receiving (154) digital data to and from portable game system 44.

For clarity, specialized coprocessors for D/A conversion, audio, or for rendering texture-mapped polygons in 3D, terrain rendering, and related graphics processing are not shown. These polygon-rendering functions are indicated by processes 301 and 301a in FIG. 4.

In portable game system 47, game programs stored in RAM 53 are executed by processor 50 which may generate graphics commands that are processed by a graphics coprocessor (not shown) which generates picture data 146 (pixels) of animated characters from variable viewpoints. This picture data 146 represents moving 3D objects in a simulated 3D game world that are rendered as 3D textured polygons by coprocessor process 301 so that 3D characters and other objects in picture data 146 can be viewed from variable and rapidly changing 3D viewpoints and angles selected by players and/or selected by program instructions executed by processor 50. The moving 3D objects may be player controlled and may be human-like characters having hands, arms, legs, faces, and clothing and performing 3D actions in a simulated 3D game world.

External memory 16, such as ROM, battery-powered SRAM, optical disk 43 (FIG. 11), or other external memory devices may provide data and programs for execution in processor 50 in portable game system 47.

Memory security processor 52 authenticates the data read from external memory 16 and may decrypt some of the program instructions. Memory security processor 52 can prevent processing of game programs and data from unauthorized sources and prevent use of counterfeit programs and data.

Processor 50 may process the following data stored in RAM 53: graphics data for a simulated 3D world, graphics data for 3D characters and other objects, definitions (polygons, textures, etc) of characters, objects, and terrain, joint articulation data, bumpmap data, 3D locations and 3D orientation of objects, data specifying movements of objects, and data for 2D maps, word menus, picture menus, and other data.

Execution of game programs in processor 50 is controlled by manually entered input signals from direction-switch 15, analog joysticks 20 and 21 (FIG. 1), touch-sensitive pad 24, touchscreen 23, button switches 14 and 57 (which may also be touch-sensitive sensors), motion sensors, and/or other manual controls in portable game system 47.

These input signals result from a human player's decisions based on observed animated pictures that are displayed on LCD 22 from picture data 146 generated by microprocessor 50 executing programs in RAM 53 and rendered by process 301. This picture data 146 may be stored in display RAM 302 (FIG. 6) as rows and columns of pixel data which are converted by LCD driver 119 (FIG. 6) to a dot matrix on LCD 22.

Touchscreen 23, touchpad 24, and controller processor 51 determine which locations on touchscreen 23 and touchpad 24 have been touched. Processor 51 outputs X and Y coordinates of the touched locations to processor 50. Use of touchscreen 23 is described below with reference to FIG. 7.

If system 44 is a portable game system linked to portable game system 47, game programs are executed by processor 50a with a graphics coprocessor which generate picture data representing textured polygons rendered by process 301a for 3D animated characters having hands, arms, legs, faces, and clothing and performing actions in a simulated 3D game world.

Processor 50 may receive data (arrow 154) from portable game system 44 and this data affects execution of programs in processor 50 which may send data (arrow 153) to system 44 to affect execution of programs in processor 50a. Processor 50a may generate data which it sends (arrow 154) to portable game system 47. Various data record formats may be transmitted between the two game systems 44 and 47.

If portable game system 44 has no external memory and system 44 is connected to portable game system 47, the game programs and data stored in external memory 16 may be transmitted from processor 50 in portable game system 47 to processor 50a in game system 44 and executed in processor 50a.

Game system 44 may read game programs and data from a data carrier such as an optically coded disk 43 or mass storage device or Internet packets and may download such programs and data to portable game system 47 through data links 154 that are preferably wireless or partly wireless. Portable game system 47 may then be disconnected from other game units and operated as an independent portable game system 47 illustrated in FIG. 7.

A video game console system 42 (FIG. 8) attached to a TV 11 may substitute for system 44 in FIG. 4. Console system 42 may read programs and data from disk 43, from an external memory 16, or from a network, for download to portable game system 47.

In the preferred embodiment, LCD 22 and/or 33 display autostereoscopic images (which require no eyeglasses or head-mounted display), so that a player may experience full depth perception of 3D characters and other objects in the 3D world viewed from different viewpoints on portable game system 47 or 44 or both.

In the autostereoscopic LCD device described below with reference to FIG. 13, the stereoscopic feature may be electrically disabled so that LCD 33 may display non-stereoscopic images such as maps, words, numbers, menus, and 2D pictures. In FIG. 4, processor 50 generates signal 339 which enables or disables parallax barrier 337 (FIG. 13) for LCD 22 in portable game system 47. If signal 339 is not enabled, parallax barrier 37 is transparent and non-stereoscopic images can be displayed on LCD 22. Likewise, processor 50*a* generates signal 339*a*. If signal 339*a* is not enabled, parallax barrier 37 is transparent and non-stereoscopic images can be displayed on LCD 33 in portable game system 44.

If a stereoscopic assembly containing LCD 33 is mechanically attached to portable game system 47 as illustrated in FIG. 1, and electrically attached through hollow hinge 198, then portable game system 47 can generate images for both LCD 22 and LCD 33 almost simultaneously. LCD 22 can display 2D images such as maps, words, numbers, and 2D pictures, while LCD 33 can display stereoscopic images of 3D characters in a 3D game world as illustrated in FIG. 1.

Figure 5:
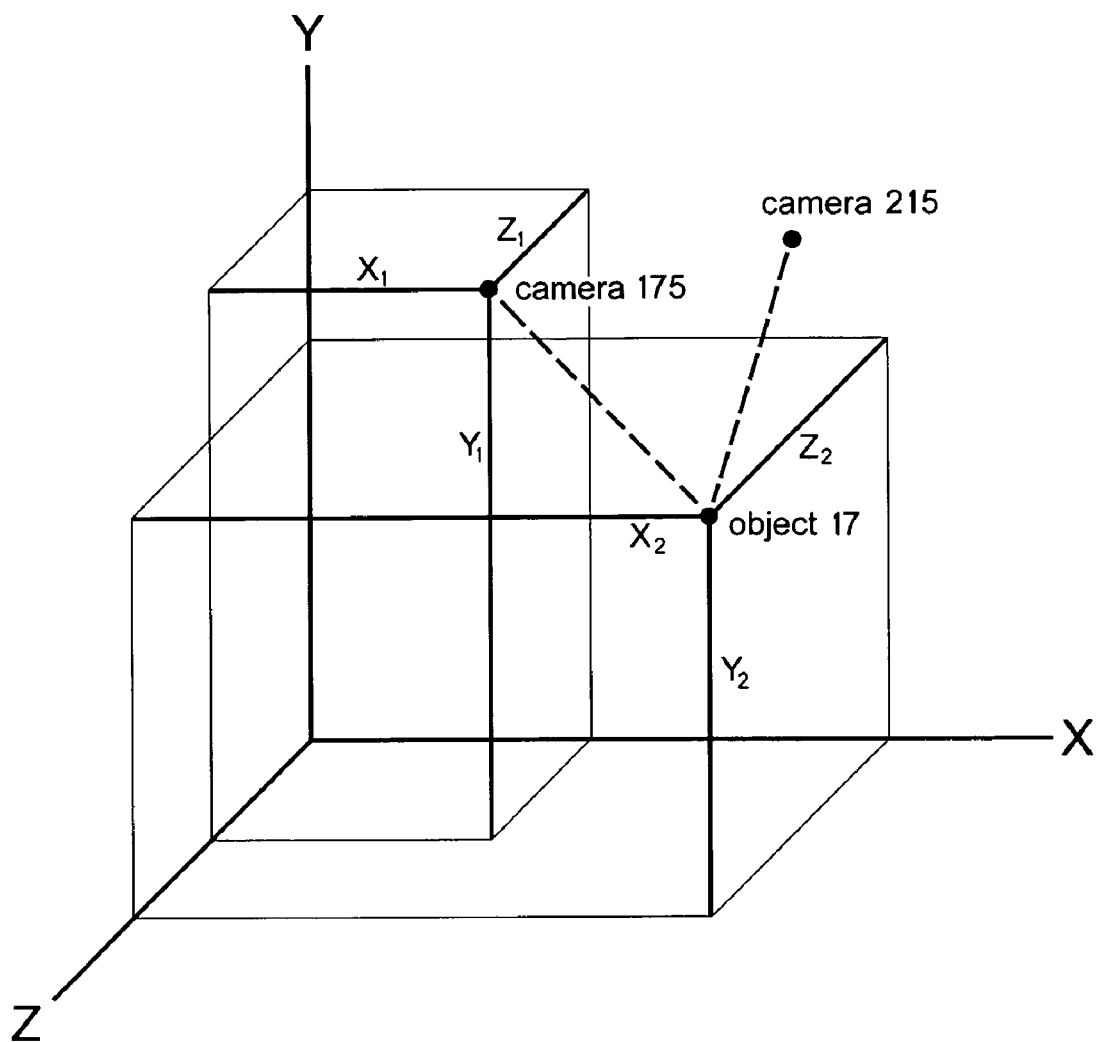
FIG. 5 is a 3-dimensional (x, y, z) cartesian graph illustrating 3D coordinates of virtual cameras and an object viewed from two different viewpoints in the 3D world.

FIG. 5 is a 3-dimensional graph illustrating Cartesian coordinates ($X_1$ $Y_1$ $Z_1$) of an exemplary viewpoint of virtual camera 175 and coordinates ($X_2$ $Y_2$ $Z_2$) of an exemplary object 17 being viewed from 3D viewpoints 175 and 215 as described above with reference to FIGS. 2 and 3. Polar coordinates would also be an appropriate equivalent. For clarity, coordinates are not shown for virtual camera 215 which views from a different viewpoint and direction than camera 175 in the generated 3-dimensional world. Viewpoints 175 and 215 may be alternative views of object 17, or may simulate visual parallax.

Figure 6:
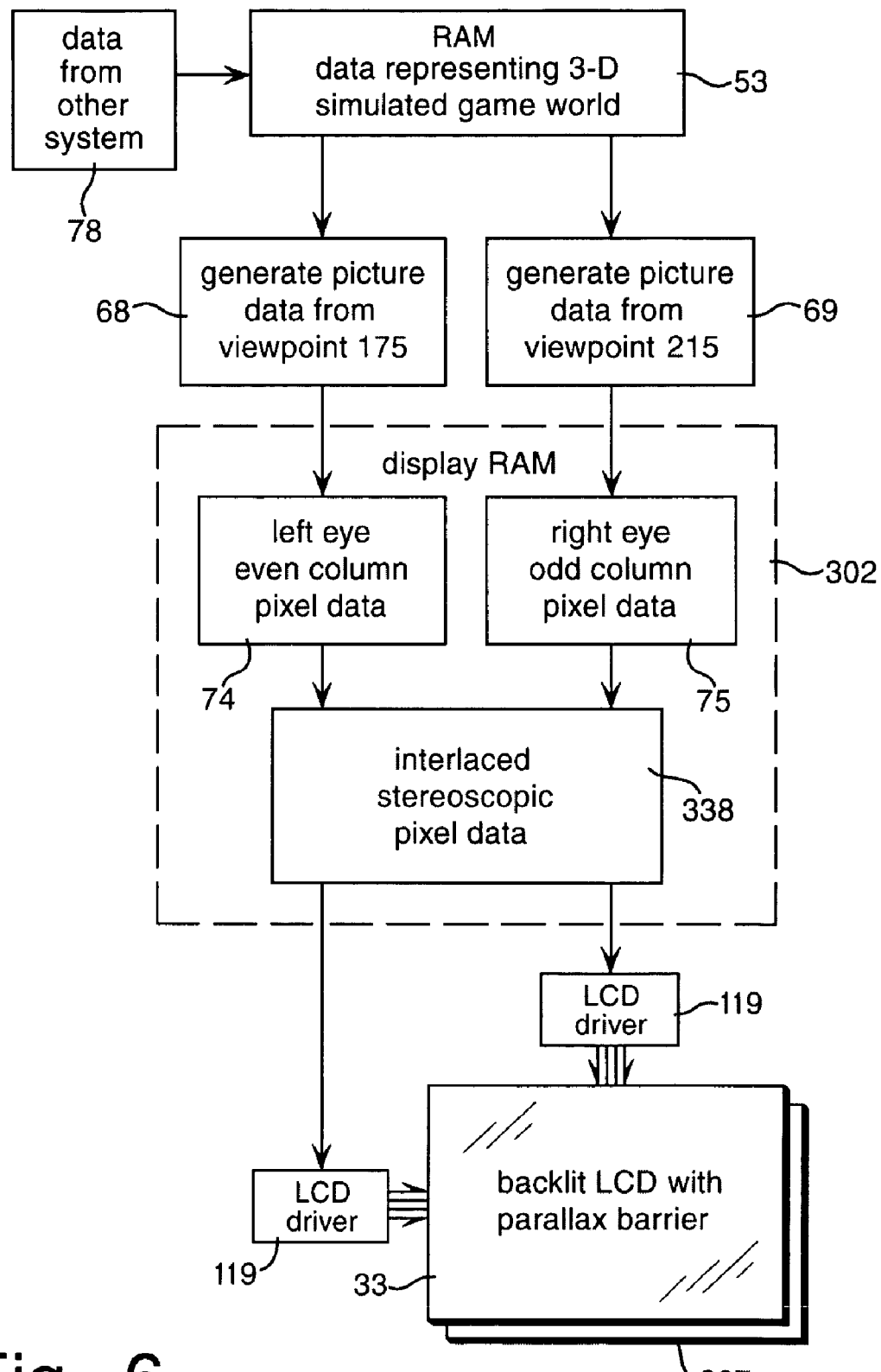
FIG. 6 is a block diagram illustrating how images of a simulated 3D game world are generated from two viewpoints for stereoscopic display on an LCD.

FIG. 6 illustrates processes for generating 3D objects in a 3D game world for display on stereoscopic LCD 33 in portable game system 44. Stored in RAM 53 is data that represents a 3D game world, data defining 3D characters and objects populating the 3D game world, and program instructions for generating graphics commands and picture data. Additional data 78 may be received from another system (portable game system 44 or video game console system 42) that specifies variables regarding objects, locations, viewing angles, etc. Processor 50 executes program instructions from RAM 53 to generate graphics commands for processing 301 by a graphics co-processor (not shown) to perform process 68 that generates picture data rendered as texture mapped polygons representing a moving 3D object 17 against 3D background terrain as viewed from viewpoint 175.

Likewise process 69 generates picture data representing object 17 and background as viewed from viewpoint 215. This rendered picture data 146 (FIG. 4) is stored in display RAM 302 as alternating columns of pixels; even numbered columns 74 of pixels for viewpoint 175 (left eye) and odd numbered columns 75 of pixels for viewpoint 215 (right eye).

The resulting array of interlaced pixel data 338 is stored in display RAM 302. LCD drivers 119 feed each pixel data element from display RAM 302 into the corresponding row and column of dot matrix LCD 33. LCD driver 119 also enables or disables parallax barrier 337 for stereoscopic mode or non-stereoscopic mode.

A special graphics processor for generating interlaced stereoscopic pixel data is not required, because a conventional graphics coprocessor can perform rendering process 301 twice for each frame, one rendering for each of two viewpoints, and store the resulting left eye pixels 74 and right eye pixels 75 interlaced in odd and even columns 338 in display RAM 302. The graphics coprocessor may be integrated with processor 50.

FIG. 7 illustrates manual use of touchscreen 23 with X,Y coordinates for indicating a two-dimensional location on the underlying LCD screen 22 (FIG. 4). FIG. 7 shows hand 37 shaped as a first and located at coordinates ($X_1$ $Y_1$). When human player 12 places her finger over the image of hand 37 on touchscreen 23 and moves her finger on touchscreen 23 in the direction of the arrow to location ($X_2$ $Y_2$)—the hand image on LCD 22 follows her finger. Pipe 35 intersects coordinates ($X_2$ $Y_2$) and hence when hand 37 intersects pipe 35 at coordinates ($X_2$ $Y_2$) the program being executed in microprocessor 50 in handheld game system 47 interprets this collision as a command to show hand 37 grasping whatever object is at coordinates ($X_2$ $Y_2$)—in this example pipe 35.

The polygons which form the shape of hand 37 in the generated images displayed on LCD 22 are then modified by microprocessor 50 (FIG. 4) to show hand 37 grasping pipe 35 on LCD 22.

A set of physical X, Y coordinates for each touched location on touchscreen 23 may be converted by processor 50 (FIG. 4) to simulated spatial coordinates X,Y,Z in the simulated 3-dimensional game world for polygon processing of hand 37 and pipe 35 in 3-dimensions by processor 50.

Figure 8:
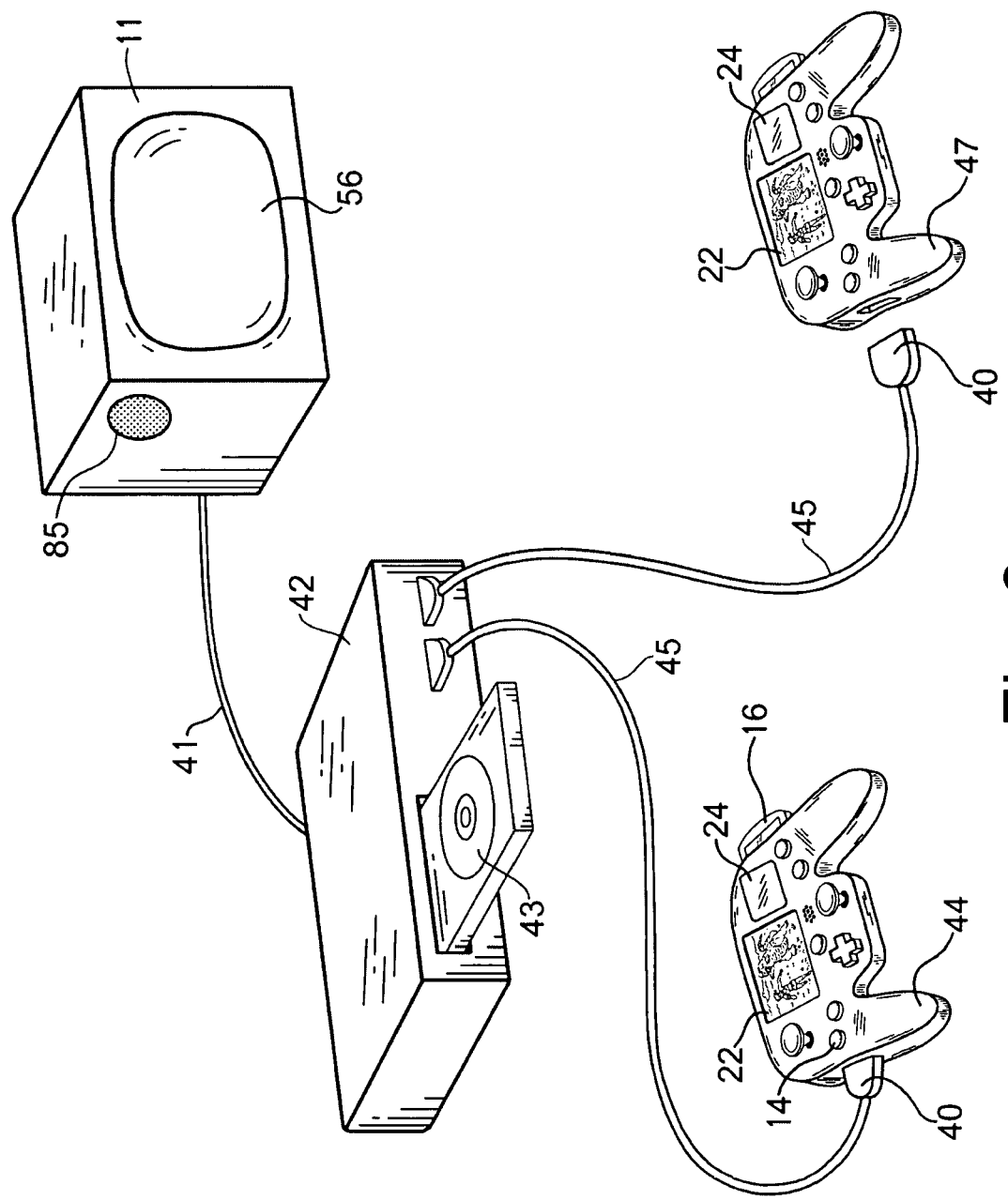
FIG. 8 is a perspective view of a video game console system linked to two portable game systems, each of which generates 3D pictures from texture rendered polygons for display on an LCD.
Figure 11:
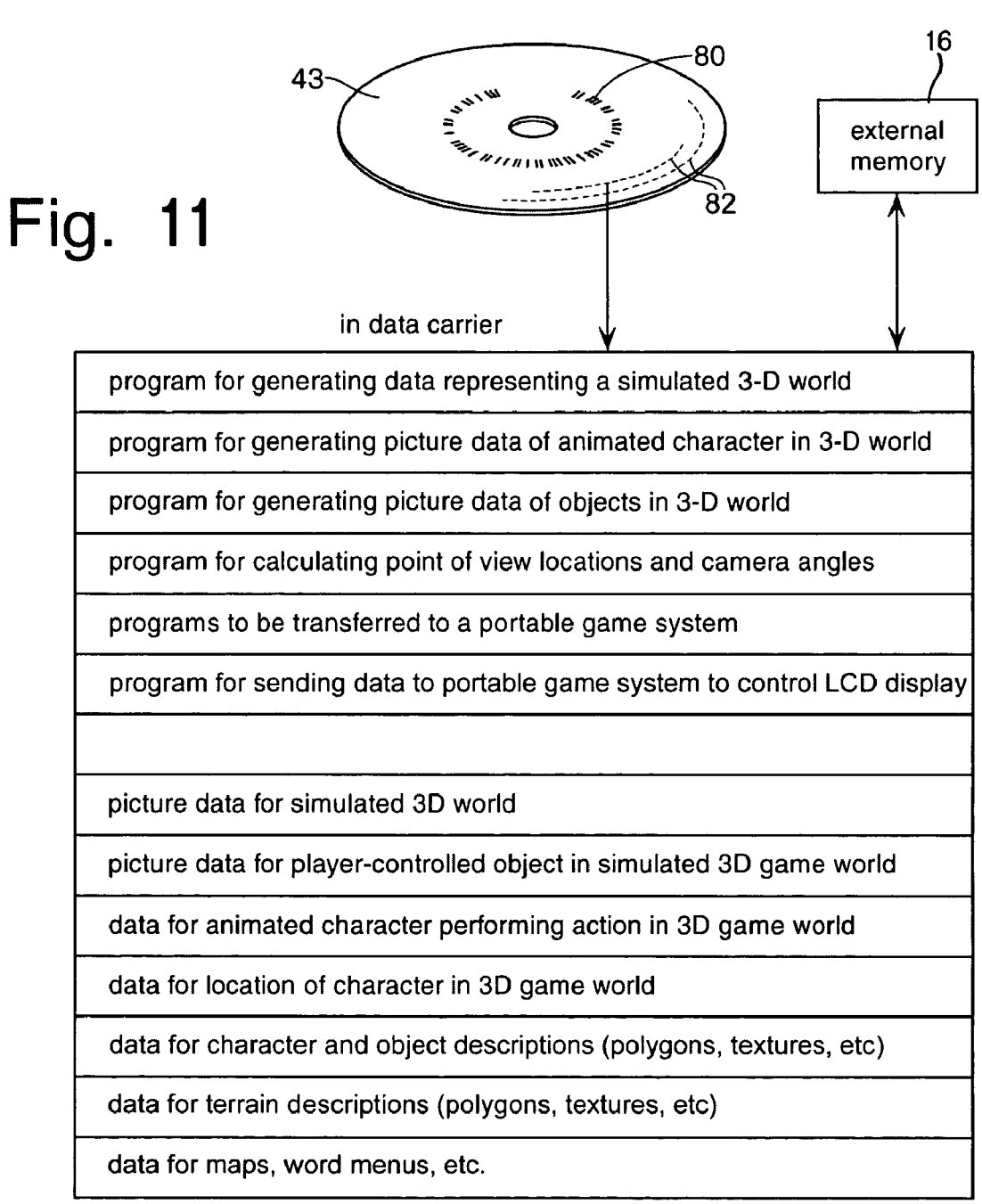
FIG. 11 is an example of a data map of game programs and data stored on an optical disk or other data carrier.

FIG. 8 is a perspective view of a game system in which two portable game systems 44 and 47 are linked to a video game console system 42 which sends a video signal on wire 41 to TV 11 for display on TV screen 56. Portable game systems 44 and 47 are as described above with reference to FIGS. 1, 4, and 7. Console system 42 reads programs and data from optical disk 43 as illustrated in FIG. 11 and may download some of these programs and data to portable game systems 44 and/or 47.

Touchpad 24 and touchscreen 23 on LCD 22 are sensitive to finger touching and can measure the approximate location of a finger on X-Y coordinates as described above with reference to FIG. 7. In FIG. 8 both touchpad 24 and touchscreen 23 on LCD 22 are specified for portable game systems 44 and 47 so that a player can use fingers of both hands to maneuver virtual objects in 3-dimensional space on LCD screen 22. A player can select an object on touchscreen 23 with one finger, and while holding the finger steadily on the object, use another finger on touchpad 24 to rotate the object into the desired position. Touchpad 24 and touchscreen 23 can also act as push-buttons by accepting a finger tap, for example, of a few hundred milliseconds as a selection indicator.

FIG. 9 illustrates an exemplary game playing session in which two game players 10 and 12 play a multiple-player game which is displayed on two portable game systems 44 and 47 respectively. Each portable game system is equipped with a processor 50 for generating textured polygons of 3D objects in simulated 3D worlds that are viewed from different viewpoints, directions, and angles, as described above with reference to FIG. 4. One or both of the LCD devices may be stereoscopic, preferably autostereoscopic.

Portable game systems 44 and 47 transmit digital data to each other through data transmission link 45 which may be wireless or may use wires. This data synchronizes the two systems so that different views of the same location in the same simulated 3D world will include the same moving 3D objects performing the same actions at the same time. Exchanged data on link 45 also insures that any changes made to the 3D game world generated by one system as a result of player control will also be made to the 3D game world generated by the other system and vice versa.

FIG. 10 is a memory map of various programs and data in RAM 53 in portable game system 47 (FIG. 4). These programs and data are only examples and may be accompanied in RAM 53 by many other programs and data.

FIG. 11 illustrates the kinds of programs and data that are stored on optical disk 43 as tracks 82 or stored in ROM or other nonvolatile external memory 16. These programs and data are only examples and may be accompanied on the disk or other data carrier by many other programs and data. Some of these programs may be executed in video game console system 42, and some may be executed in portable game systems 44 and/or 47.

Figure 12:
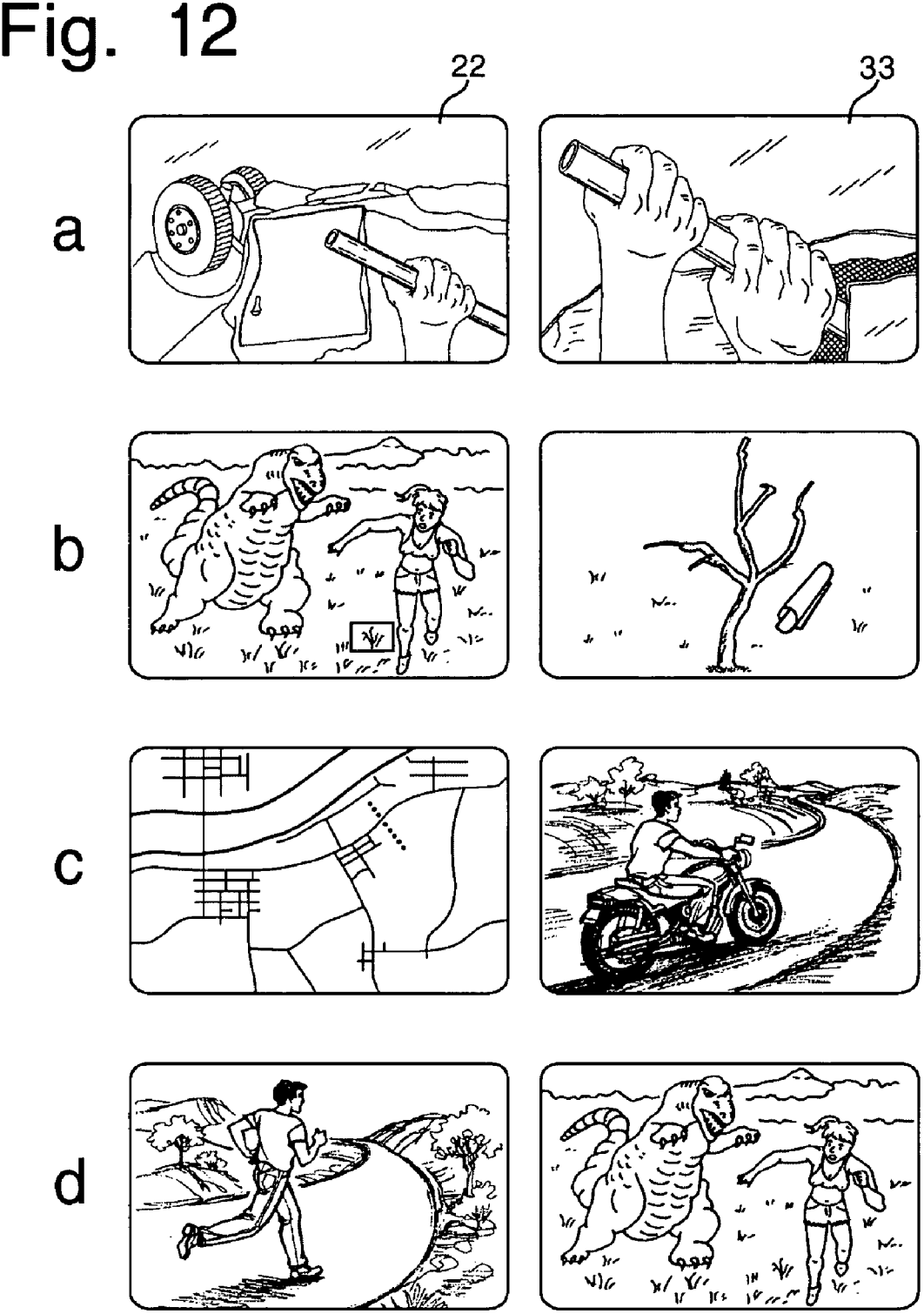
FIG. 12 illustrate various pictures and maps displayed on portable game LCDs.

FIG. 12 illustrates 3D images that may be displayed on LCD 22 and LCD 33 in FIGS. 1 and 7 and other drawings. For example, a 2D map FIG. 12c may be displayed on non-stereoscopic LCD 22 while the 3D view of a motorcycle and rider may be displayed stereoscopically on LCD 33. Another example is FIG. 12d where both LCDs display images of a 3D world and 3D characters. One image may be stereoscopic and the other not, or both may be stereoscopic, or neither be stereoscopic.

Figure 13:
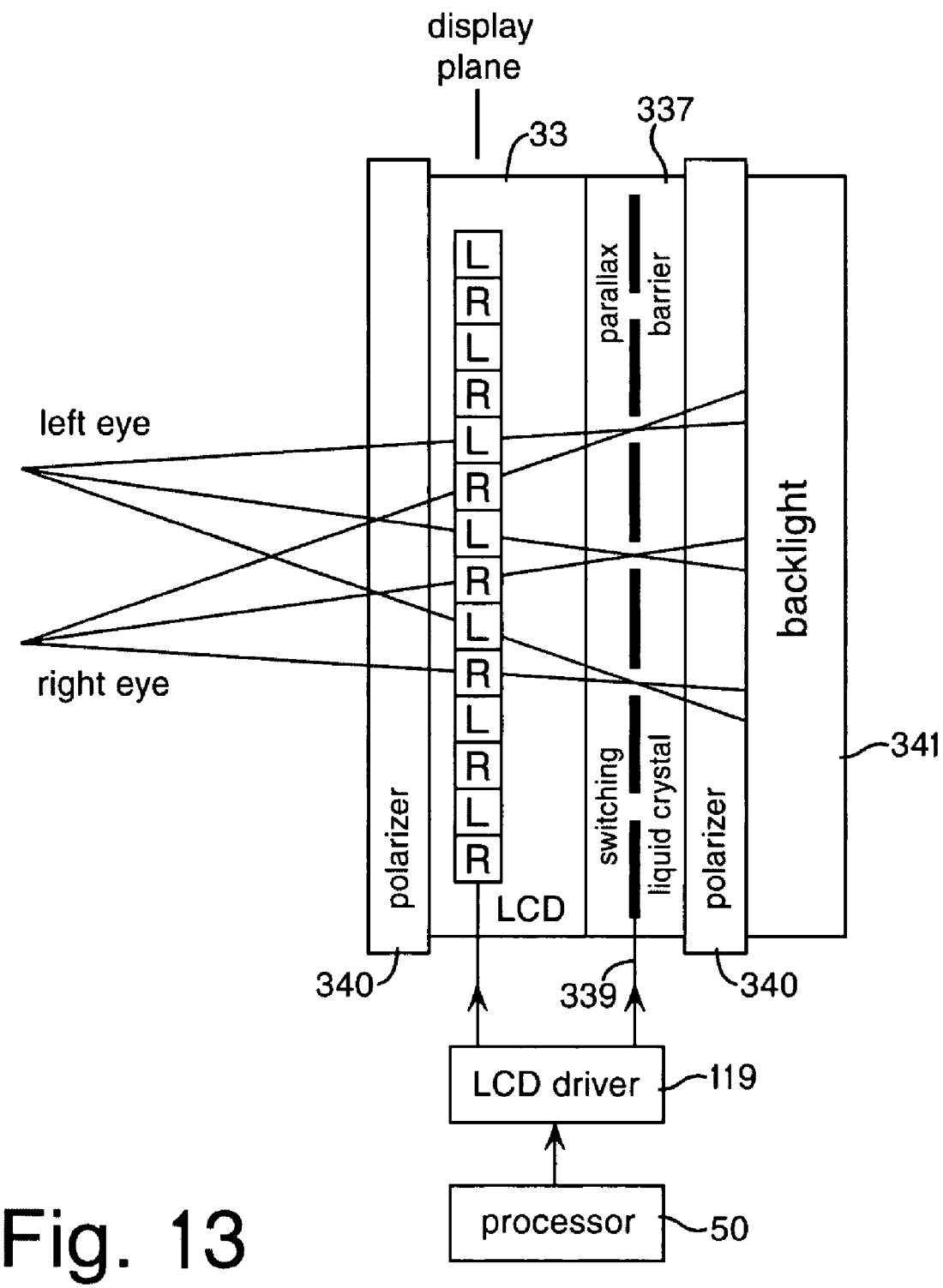
FIG. 13 illustrates a cross-sectional view of an autostereoscopic LCD display device described in US patent application 2004/0012671.

FIG. 13 illustrates an exemplary cross-sectional view of an autostereoscopic LCD device 33 such as described above with reference to FIG. 1. The term "autostereoscopic" as used herein means providing parallax image information to both eyes, without requiring a viewing aid such as eyeglasses or head-mounted device such as time division shutters. Further details of autostereoscopic LCD devices may be found in US patent application 2004/0012671.

The autostereoscopic LCD device 33 illustrated in FIG. 13 has an LCD display plane with alternating columns of pixels that provide interlaced image lines for the player's left eye and right eye. The LCD display plane is sandwiched between conventional input and output polarizers 340. A switchable parallax barrier 337 (a second LCD with transparent vertical slits) is also positioned, in this example, between the two polarizers 340. Backlight 341 provides transmitted illumination through the slits during stereoscopic use.

Processor 50 sends an electrical signal 339 (see also FIG. 4) to parallax barrier 337 during stereoscopic use which blocks transmitted light through the parallax barrier, and hence through the display plane LCD, except for the transparent vertical slits that provide illumination through each left-right pair of pixel columns in the display plane. If signal 339 is not enabled, parallax barrier 337 is transparent so that LCD screen 33 may display 2D images such as maps, words, numbers, symbols, graphs, cartoons, and 2D pictures.

Figure 14:
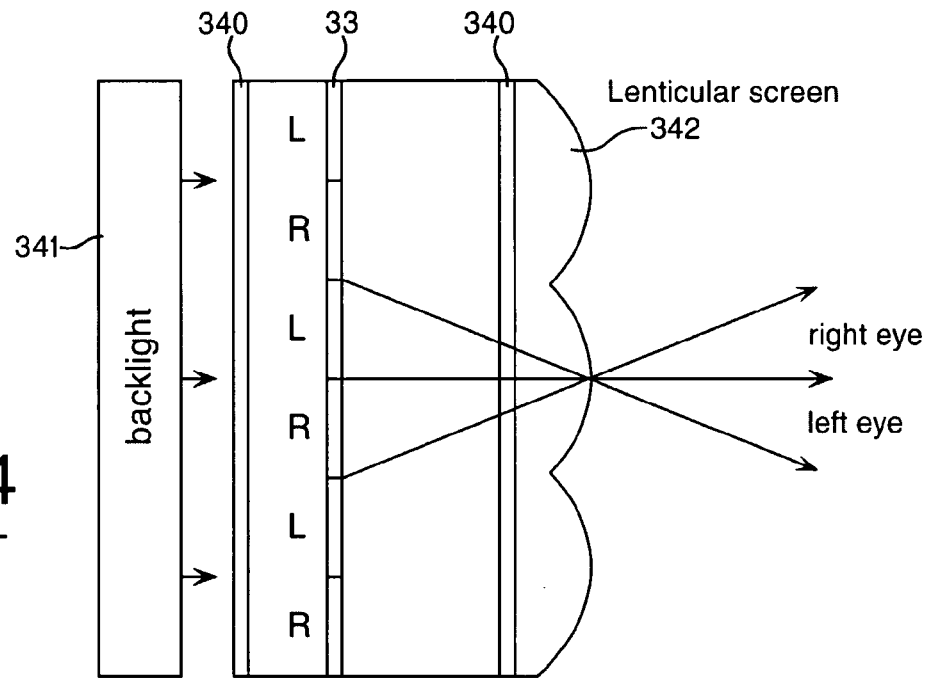
FIGS. 14 and 14a illustrate cross-sectional views of two alternative autostereoscopic splay devices described in U.S. Pat. No. 6,055,013.

FIG. 14 illustrates an exemplary cross-sectional view of an autostereoscopic LCD device 33 that has a lenticular lens 342 and backlight 341 to provide left/right image separation without requiring a viewing aid. Further details of lenticular LCD devices may be found in U.S. Pat. No. 6,055,013.

Figure 14A:
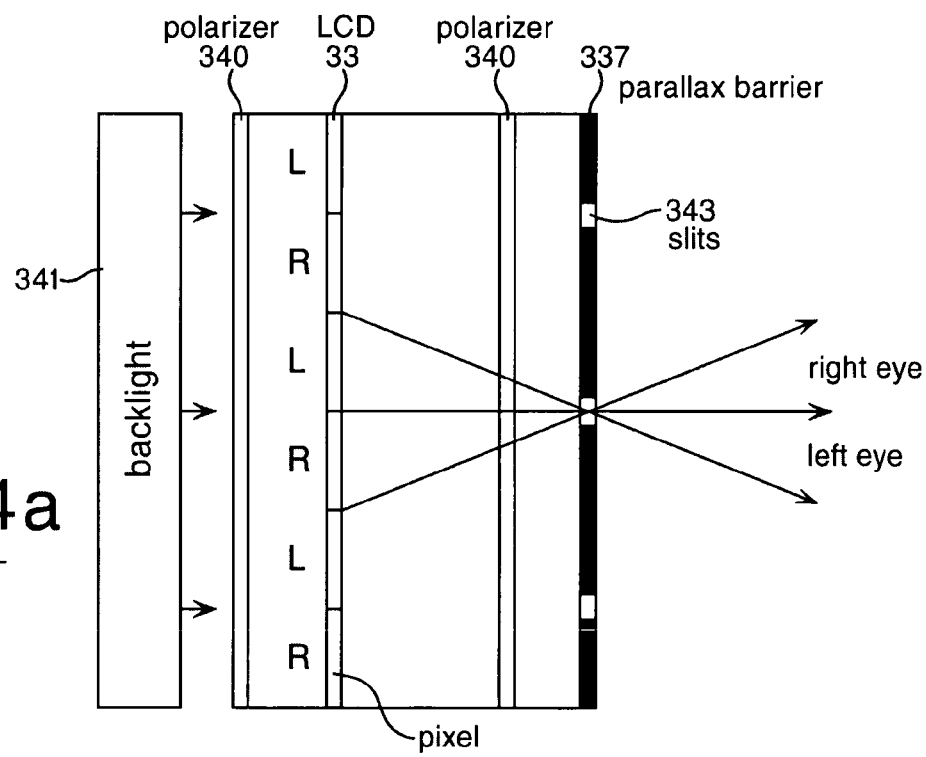

FIG. 14a illustrates an exemplary cross-sectional view of an autostereoscopic LCD device 33 that has a parallax barrier 337 in front of the polarizer-LCD-polarizer sandwich to provide image separation through vertical slits 343 without requiring a viewing aid. Further details of parallax barrier devices may be found in U.S. Pat. No. 6,055,013.

The details of stereoscopic LCD device 33 are given here only as examples and numerous other designs may be used, and may include but are not limited to autostereoscopic displays, display devices that may or may not have a parallax barrier, display devices that may have a lenticular screen, dual display devices, and display devices that require additional polarizing filters or polarizing eyeglasses or head mounted displays.

The term "portable game system" is a term of art that means a handheld game system that is battery powered and contains a discrete display device (e.g. LCD) and can be operated as an independent game system without any connection to other systems or TV.

The details of portable game systems 44 and 47 are given here only as examples and numerous other alternative designs may be used.

The term "LCD" (liquid crystal display) has been used herein as an illustrative example of any display device having discrete dot-matrix picture elements. LED (light emitting diode) and plasma displays are also discrete display devices and may be used non-stereoscopically or stereoscopically with suitable parallax barriers.

The term "program" as used herein may consist of more than one loadable module and typically includes executable instruction data, operation codes, digital addresses, and any other data that is typically part of a program module or modules.

Although I have described my invention with a degree of particularity in connection with what is presently considered to be the most practical and preferred embodiments, the foregoing description has been made only by way of illustration and example and is not to be interpreted as restrictive or limiting as to the meaning or scope of words in the patent or its claims. It is understood that various modifications, variations, arrangements, alternatives, and/or equivalents, can be devised without departing from the spirit and scope of the invention defined by the claims.

REFERENCE NUMBERS IN DRAWINGS 10 human game player
11 television (TV) set or video monitor
12 human game player
14 control switch
15 direction control switch
16 external memory
17 player character or object
18 player character or object
19 linked system in general
20 joystick
21 joystick
22 LCD screen
24 touch-sensitive input device
27 speaker
33 LCD screen
40 electrical connector
41 video signal cable to TV
42 video game system console
43 optical disk
44 portable game system
45 data link between two systems
47 portable game system
50 processor in portable system
50a processor in portable system
52 memory security processor
53 RAM
56 video screen
57 control switch
68 program process
69 program process
74 pixel data
75 pixel data 76 boot ROM in portable system
76a boot ROM in portable system
78 data record
80 burst cutting area (BCA) of disk
82 tracks molded into disk
83 optical disk reader
85 speaker
90 RAM in console system
119 LCD driver
146 animated picture data
151 console program
152 portable game system program
153 data transmission
154 data transmission
173 virtual "camera"
175 virtual "camera"
177 "camera" angle
185 conventional handheld controller
186 data link to auxiliary display
198 hinge
215 virtual "camera"
216 "camera" angle
301 polygon rendering
301a polygon rendering
337 parallax barrier
338 interlaced stereoscopic pixel data
339 stereoscopic feature enabled
339a stereoscopic feature enabled
340 polarizer
341 backlight
342 lenticular optical screen
343 transparent slits in parallax barrier

I claim:

1. A portable game system comprising:
    (a) a processor for generating polygon vertex data that represents shapes of a player-controlled 3-dimensional simulated object moving in a 3-dimensional simulated game space;
    (b) a processor for rendering said polygon vertex data as first pixel data that represents an image of said simulated object from a variable first viewpoint in said 3-dimensional game space;
    (c) a processor for rendering said polygon vertex data as second pixel data that represents an image of said simulated object from a variable second viewpoint that is displaced in said 3-dimensional game space from said first viewpoint;
    (d) a portable autostereoscopic discrete display device that displays said first and second pixel data as corresponding left and right interlaced images for stereoscopic viewing from at least one viewing zone;
    (e) a parallax barrier mounted on said discrete display device that inhibits said left and right interlaced images from being simultaneously displayed to one eye;
    (f) a touch sensitive transparent panel mounted on said discrete display device for detecting a variable sequence of locations touched on said panel by a manually operated physical object moving in contact with the surface of said panel, wherein said discrete display device displays said left and right interlaced images through said transparent panel into said viewing zone;
    (g) first writable data memory for storing at least a portion of a sequence of 2-dimensional coordinates of said touched locations, a corresponding sequence of 3-dimensional spatial coordinates of a portion of said player-controlled object, and a corresponding sequence of 2-dimensional coordinates of display locations on said discrete display device;
    (h) a manually operable control device that generates control data that causes said simulated object to move in a third dimension of said sequence of 3-dimensional spatial coordinates;
    (i) wherein at least one of said 2-dimensional coordinates of said display locations is different in at least one value compared to said corresponding 2-dimensional coordinates of touched locations;
    (j) a processor for converting said portion of a sequence of 2-dimensional coordinates of touched locations to said corresponding sequence of 3-dimensional spatial coordinates for storage in said first writable data memory;
    (k) a processor for generating simulated 3-dimensional motion of at least a portion of said player-controlled object moving through said first sequence of 3-dimensional spatial coordinates in said game space; and
    (l) said discrete display device stereoscopically displaying said left and right interlaced images of said player-controlled object moving through said sequence of display coordinates corresponding to said 3-dimensional spatial coordinates.

2. The game system of claim 1, wherein said control device is any from the group comprising: touchpad, touchscreen, joystick, direction switch, button switch, motion sensor, and a combination thereof.

3. The game system of claim 1, wherein said discrete display device is a liquid crystal display (LCD) device.

4. The game system of claim 1, wherein said processors are the same processor.

5. The game system of claim 1, wherein said processors comprise a first processor and a graphics coprocessor.

6. The game system of claim 1, wherein transparency of said parallax barrier is controlled by one of said processors for 2-dimensional and 3-dimensional display.

7. The game system of claim 1, further comprising a second discrete display device for displaying non-stereoscopic images.

8. The game system of claim 1, further comprising a second autostereoscopic discrete display device.

9. The game system of claim 1, wherein said simulated object is a grasping hand that grasps a second player-controlled object.

10. A portable game system comprising:
    (a) a processor for generating polygon vertex data that represents shapes of a player-controlled 3-dimensional simulated object moving in a 3-dimensional simulated game space;
    (b) a processor for rendering said polygon vertex data as first pixel data that represents an image of said simulated object from a variable first viewpoint in said 3-dimensional game space;
    (c) a processor for rendering said polygon vertex data as second pixel data that represents an image of said simulated object from a variable second viewpoint that is displaced in said 3-dimensional game space from said first viewpoint;
    (d) a portable autostereoscopic discrete display device that displays said first and second pixel data as corresponding left and right interlaced images for stereoscopic viewing from at least one viewing zone;
    (e) a touch sensitive transparent panel mounted on said discrete display device for detecting a variable sequence of locations touched on said panel by a manually operated physical object moving in contact with the surface of said panel, wherein said discrete display device displays said left and right interlaced images through said transparent panel into said viewing zone;

(f) first writable data memory for storing at least a portion of a sequence of 2-dimensional coordinates of said touched locations, a corresponding sequence of 3-dimensional spatial coordinates of a portion of said player-controlled object, and a corresponding sequence of 2-dimensional coordinates of display locations on said discrete display device;

(g) wherein at least one of said 2-dimensional coordinates of said display locations is different in at least one value compared to said corresponding 2-dimensional coordinates of touched locations;

(h) a processor for converting said portion of a sequence of 2-dimensional coordinates of touched locations to said corresponding sequence of 3-dimensional spatial coordinates for storage in said first writable data memory;

(i) a processor for generating simulated 3-dimensional motion of at least a portion of said player-controlled object moving through said first sequence of 3-dimensional spatial coordinates in said game space; and (j) said discrete display device stereoscopically displaying said left and right interlaced images of said player-controlled object moving through said sequence of 3-dimensional spatial coordinates.

11. The game system of claim 10, further comprising a manually operable control device that generates control data that causes said simulated object to move in a third dimension of said sequence of 3-dimensional spatial coordinates, wherein said control device is any from the group comprising: touchpad, touchscreen, joystick, direction switch, motion sensor, and a combination thereof.

12. A computer readable data storage medium for use with a game system, said data storage medium storing game program instructions comprising:

(a) executable instructions that cause said game system to generate polygon vertex data that represents shapes of a player-controlled 3-dimensional simulated object moving in a 3-dimensional simulated game space;

(b) executable instructions that cause said game system to render said polygon vertex data as first pixel data that represents said simulated object from a variable first viewpoint in said 3-dimensional game space;

(c) executable instructions that cause said game system to render said polygon vertex data as second pixel data that represents said simulated object from a variable second viewpoint that is displaced in said 3-dimensional game space from said first viewpoint;

(d) executable instructions that cause said game system to display said first and second pixel data as corresponding left and right images on a portable autostereoscopic discrete display device for viewing from at least one viewing zone;

(e) executable instructions that cause said game system to process data that represents a variable sequence of locations touched on a touch sensitive transparent panel by a manually operated physical object moving in contact with the surface of said panel, wherein said transparent panel is mounted on said discrete display device which displays said left and right images through said transparent panel into said viewing zone;

(f) executable instructions that cause a writable data memory to store at least a portion of a sequence of 2-dimensional coordinates of said touched locations, to store a corresponding sequence of 3-dimensional spatial coordinates of a portion of said player-controlled object, and to store a corresponding sequence of 2-dimensional coordinates of display locations, wherein at least one of said 2-dimensional coordinates of said display locations is different in at least one value compared to said corresponding 2-dimensional coordinates of touched locations;

(h) executable instructions that cause said game system to convert said portion of a sequence of 2-dimensional coordinates of touched locations to said corresponding sequence of 3-dimensional spatial coordinates for storage in said writable data memory;

(i) executable instructions that cause said game system to generate simulated 3-dimensional motion of at least a portion of said player-controlled object moving through said first sequence of 3-dimensional spatial coordinates in said game space; and (j) executable instructions that cause said game system to stereoscopically display on said discrete display device said left and right images of said player-controlled object moving through said sequence of 3-dimensional spatial coordinates.

13. The data storage medium of claim 12, wherein said data storage medium is from the group comprising: an optically coded medium, a semiconductor memory, and a magnetic data storage medium.

14. The data storage medium of claim 12, wherein said data storage medium is a writable data memory into which said game program instructions are downloaded from a separately housed system.

* * * * *